United States Patent [19]

Sirdesai et al.

[11] Patent Number: 5,383,959
[45] Date of Patent: Jan. 24, 1995

[54] REVERSIBLE INKS

[75] Inventors: Sunil J. Sirdesai, San Diego; Gerald Odstrchel, San Juan Capistrano, both of Calif.

[73] Assignee: Xytronyx, Inc., San Diego, Calif.

[21] Appl. No.: 23,784

[22] Filed: Feb. 22, 1993

[51] Int. Cl.$^6$ .............................................. C09D 11/00
[52] U.S. Cl. .................. 106/21 A; 106/21 D; 106/22 B; 427/160
[58] Field of Search ............... 106/21 A, 21 R, 21 D, 106/22 B; 427/160; 252/586

[56]  References Cited

U.S. PATENT DOCUMENTS

| | | | |
|---|---|---|---|
| 3,565,814 | 2/1971 | Pellon | 252/586 |
| 3,843,550 | 10/1974 | Hinnen | 252/586 |
| 4,215,010 | 7/1980 | Hovey et al. | 252/586 |
| 4,342,668 | 8/1982 | Hovey et al. | 252/586 |
| 4,367,170 | 1/1983 | Uhlmann et al. | 252/586 |
| 4,637,698 | 1/1987 | Kwak et al. | 252/586 |
| 4,699,473 | 10/1987 | Chu | 252/586 |
| 4,720,547 | 1/1988 | Kwak et al. | 252/586 |
| 4,792,224 | 12/1988 | Kwiatkowski et al. | 252/586 |
| 4,812,171 | 3/1989 | Brettle et al. | 106/21 A |
| 4,927,180 | 5/1990 | Trundle et al. | 283/70 |
| 4,992,347 | 2/1991 | Hawkins et al. | 430/10 |
| 4,994,208 | 2/1991 | McBain et al. | 252/586 |
| 5,017,225 | 5/1991 | Nakanishi et al. | 106/21 A |
| 5,208,132 | 5/1993 | Kamada et al. | 252/586 |

FOREIGN PATENT DOCUMENTS

| | | |
|---|---|---|
| 0227337 | 1/1987 | European Pat. Off. |
| 196673 | 8/1988 | Japan . |
| 20576 | 1/1990 | Japan . |

OTHER PUBLICATIONS

English language translation of JP63/196673, Aug. 1988.
English language translation of JP02/20576, Jan. 1990.
Nori Y. C. Chu, et al. "Innovative Concepts For The Solar Building Program Evaluation Of Photochromic Plastics Final Report for Period Oct. 1987 –'Sep. 1988" U.S. G.P.O., U.S. Department of Energy, Contact No. DE-AC03-87SF17300, NTIS #DOE/SF/17300-T1 (Oct., 1988).

*Primary Examiner*—Helene Klemanski
*Attorney, Agent, or Firm*—Lyon & Lyon

[57]  ABSTRACT

Photochromic ink comprising a spiroheterocycle or metal dithiozonate photochromic dye.

32 Claims, No Drawings

REVERSIBLE INKS

BACKGROUND OF THE INVENTION

This invention relates to inks that exhibit different visible properties dependent on external light conditions.

TCS INDUSTRIES in North Carolina (not admitted to be prior art to the present invention) advertise black and white and color emblems on T-shirts which are said to exhibit their color only in the presence of the sun's ultraviolet rays. The photochromic inks are said to react with the sun's ultraviolet rays and thus will not cause unsightly body heat and perspiration shadings associated with other changeable inks.

Trundle et al, U.S. Pat. No. 4,927,180 describe a photochromic ink, containing a photochromic fulgide, fulgimide or spiropyran, which reversibly convert to a colored form upon exposure to U.V. light. A superficial protective layer is provided to protect the photochromic compound from moisture and oxygen.

Hawkins et al., U.S. Pat. No. 4,992,347 describe photochromic compounds, specifically fulgides, that can be permanently converted into non-photochromic compounds by overexposure to U.V. light.

Brettle et al., U.S. Pat. No. 4,812,171 describe a photochromic marking, containing 1,2-dihydroquinoline, which is irreversibly converted to a colored state by exposure to U.V. light.

SUMMARY OF THE INVENTION

This invention features light-sensitive photochromic inks of the spiroheterocycle and metal dithiozonate families provided within plastisols, polyurethane and polyesterurethane dispersions. These inks are particularly useful for application to clothing since they are color, fade, and wash resistant. The ink can be used to mark most surfaces, and is useful for advertising and promotions.

Marking consists of application of the ink to a substrate by either overlaying onto or physical incorporation into the substrate. Marking by the process of physical incorporation does not include any chemical processes (e.g., copolymerization). Substrate as defined in the art means any material that accepts another material. Substrates that can be marked with the inks of the invention include all organic substrates (e.g., paper, plastic, fabric, thread, cloth, natural polymeric substrate, e.g., collagen) and nonorganic substrates (e.g., metals, metal composites, glass, ceramics, and graphite).

Overlaying the inks of the invention onto the substrate can be carried out by printing (e.g., silk screening, rotary analog, laserjet) or by standard coating procedures (e.g., painting, spraying, dipping). These printing and coating procedures are known to those in the art.

Applicant has surprisingly discovered that inks of the invention can be printed onto substrates either by silk screen or by rotary analog printing (flexoprinting or gravure printing) processes. Typically inks are formulated to provide a consistency that is suitable for one printing process or the other. For example, an ink suitable for silk screening provides a heavy coat, while an ink suitable for use in rotary analog printing is applied in a lighter coat. In distinction, the ink of the invention can be printed using either process.

Incorporation of the inks of the invention into the substrate is achieved by mixing the substrate and the ink, using non-chemical, physical procedures (e.g., heating, mechanical agitation, solubilization). These physical procedures are known to those in the art.

Thus, in various aspects, the invention features photochromic inks, and methods for their use.

By "photochromic ink" is meant a formulation formed as fluid ink which changes color when exposed to light radiation i.e., ultraviolet rays, and provides a sufficiently high color density for use in the printing processes described above. Such a color density provides a clear visual change which can be readily discerned by an unaided average human eye. Thus, the ink allows UV-sensitive generation of color or black and white images on fabrics or other materials, useful for advertising and the like.

The photochromic inks of the claimed invention contain dyes that are members of the spiroheterocycle family and the metal dithiozonate family. Such dyes are preferably provided in an amount between 0.05–5.0 wt %.

The spiroheterocycle family of dyes is represented by the general formula:

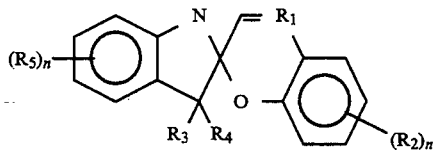

where $R_1 = N$, CH; $R_2 = C_1-C_8$ alkyl, allyl, acrylyl ($C_2-C_6$) alkyl, methacrylyl ($C_2-C_6$) alkyl, carboxy, cyano ($C_2-C_6$) alkyl, $C_1-C_4$ acyloxy ($C_2-C_6$) alkyl, and $C_1-C_3$ alkoxy ($C_1-C_3$) alkyl; $R_3$ & $R_4 = C_1-C_5$ alkyl, phenyl, mono and disubstituted phenyl, benzyl or $R_3$ & $R_4$ may combine to form a carbocyclic ring selected from the group consisting of an alicyclic ring containing from 6 to 8 carbon atoms, norbornyl, and adamantyl; $R_5 = C_1-C_5$ alkyl, or $C_1-C_5$ alkoxy, or halogen, or halogenated alkyl or alkoxy groups; and each n separately is between 0 and 4 inclusive, preferably.

The spiroheterocycle family includes: Spiro(indolino)napthoxazines, Spiro(indolino) pyridobenzoxazines, Spiro(indolino) benzoxazines, Spiro(indolino) benzopyrans, Spiro(indolino) naphthopyrans, Spiro(benzindolino) pyridobenzoxazines, Spiro(benzindolino) naphthoxazines, Spiro(benzindolino) naphthopyrans and Spiro(di)-hydroindolizines.

The metal dithiozonate family is represented by the following general formula:

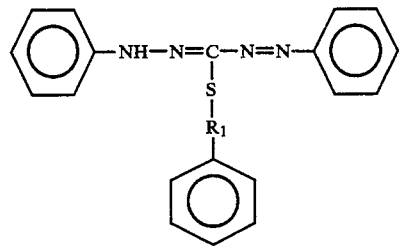

where $R_1 =$ Hg, Pb, Cd.

A member of the metal dithiozonate family of dyes is (diphenylthiocarbazono) phenyl mercury (DPM).

The inks of the claimed invention preferably contain one or more of the following dyes: 1,3-dihydro-1,3,3-trimethylspiro (2H-indole-2,3'-[3H]-naphth[2,1- b][1,4]oxazine) (DINO); 5-chloro-1,3-dihydro-1,3,3-trimethylspiro (2H-indole-2,3'-[3H]-naphth[2,1-b][1,4]oxazine) (CDINO); and 1',3'-Dihydro-1',3',3'-trimethyl-6-nitrospiro[2H-1-benzopyran-2,2'-(2H)-indole].

Specifically, these dyes are provided as a formulation, e.g., within a polyvinyl chloride (PVC), polyurethane or polyesterurethane dispersion, with or without plasticizers, dispersants, surfactants, flow aids, and thickeners.

The term "polyvinyl chloride" is well known in the art, and includes any polyvinyl chloride molecule, as well as comixtures with any adhesion enhancing polymer (e.g., PVAC, phenolics), which have a viscosity equal to or greater than 0.7. Examples include: GEON 120×400, inherent viscosity=1 (BF Goodrich) or GEON 125A, inherent viscosity=0.7 (BF Goodrich)). Polyvinyl chloride is preferably provided in an amount between 40–80 wt %.

The term "polyurethane dispersion" is well known in the art, and includes all dispersions of polyurethane which have a viscosity equal to or greater than 0.7. Examples include: Bayhydrol 402A (Miles), Bayhydrol LS 2033 (Miles), and Bayhydrol 140 AQ (Miles). Such polyurethane dispersion is preferably provided in an amount between 90–95 wt %.

The term "polyesterurethane dispersion" is well known in the art, and includes all dispersions of polyesterurethane which have a viscosity equal to or greater than 0.7. An example is Impranil DLN (Miles). Such polyesterurethane dispersion is preferably provided in an amount between 90–95 wt %.

The term "plasticizer" is well known in the art and is understood to mean a substance or material which is incorporated in the polymer to aid in processing (i.e., forming the dye as a fluid ink suitable for application to fabrics or other materials useful in this invention) and to impart flexibility or fluidity to the polymer. Examples are well known in the art, and include: dioctyl phthalate, tritolyl phosphate, epoxidized soybean oil, palatinol, dibutyl sebactate, Bis (2-ethyl-hexyl) phthalate, or dibutyl phthalate. Such plasticizer is preferably provided in an amount between 20–60 wt %. In a preferred embodiment, the plasticizer, tritolyl phosphate, is useful since it also introduces flame retardant properties into the ink formulation.

The term "dispersant" is well known in the art, and is understood to mean a polar compound which forms a strong attachment to the resin particles (i.e., the PVC etc., described above) and aids in the wetting and dispersing of these particles. Examples include: diisobutyl ketone and butyl acetate. Such dispersant is preferably provided in an amount between 0–20 wt %.

The term "surfactant" is well known in the art, and is understood to mean a surface active agent which lowers viscosity and improves viscosity stability and air release (e.g., Silwet L-7601 (Union Carbide)). Such surfactant is preferably provided in an amount between 0.1–2 wt %.

The term "flow aid" is well understood in the art, and is understood to mean a neutral, water soluble solvent which is used to provide consistency and flow characteristics. Examples include: glycols (e.g., diethylene glycol), gum esters, and ester alcohols such as pentane diol esters (Texanol from Eastman Kodak). Such flow aid is preferably provided in an amount between 5–20 wt %.

The term "thickener" is well known in the art, and is understood to mean a viscosity modifier which is water compatible, non-ionic and inert to the acid/base chemistry of the dyes. Examples include the non-ionic Acrysol RM-series from Rohm and Haas (e.g., Acrysol RM-825). Such thickening agent is preferably provided in an amount between 0.1–1 wt %.

Other features and advantages of the invention will be apparent from the following description of the preferred embodiments thereof, and from the claims.

DESCRIPTION OF THE PREFERRED EMBODIMENTS

Inks of this invention are generally described above. There follows examples of such inks. Those in the art will recognize that these only exemplify such inks and are not limiting in this invention.

EXAMPLE 1

Series I ink formulations contain PVC.

| Formulation | Series I Formulations | | |
|---|---|---|---|
| | A | B | C |
| PVC[1] | 16.25 g. | 16.25 g. | 16.25 g. |
| Plasticizer[2] | 8.25 g. | 8.25 g. | 8.25 g. |
| Dispersant[3] | 2.50 g. | 1.30 g. | 0 |
| Dye[4,5] | 0.05 g. | 0.05 g. | 0.05 g. |

[1]PVC: Geon 120 × 400, inherent viscosity = 1 (BF Goodrich), Geon 125A, inherent viscosity = 0.7 (BF Goodrich)
[2]Plasticizers: Dioctyl phthalate, Tritolyl phosphate, Epoxidized Soybean Oil, Palatinol
[3]Dispersants: Diisobutyl ketone, Butyl acetate
[4]Dyes: 1,3-Dihydro-1,3,3-trimethylspiro (2 H-indole-2,3'-[3H]-naphth [2,1-b] [1,4]oxazine) (DINO), 5-Chloro-1,3-Dihydro-1,3,3-trimethylspiro (2H-indole-2,3'-[3H]-naphth [2,1-b] [1,4]oxazine) (CDINO), 1',3'-Dihydro-1',3',3'-trimethyl-6-nitrospiro[2H-1-benzopyran-2,2'-(2H)-indole].
[5]The amount of dyes used varied from 0.05 g. to 0.2 g.

Ink formulations are prepared in the following manner.

Formulations A and B

Plasticizer and dispersant are added to the PVC resin and stirred until a homogeneous mixture is obtained. The photochromic dye is then added and stirring continued for an additional hour. These formulations need to be heat-cured to crosslink the polymer. If the formulations are used in flexoprinting or gravure printing they are heat-cured during the printing process. If the formulation is silk-screened it can be contacted with a hot surface, such as a hot iron, for 15 seconds to heat-cure the system.

Formulation C

Plasticizer is added to PVC resin and stirred until a homogenous mixture is obtained. The photochromic dye is then added and stirring is continued for an additional hour. This formulation is then silk-screened and can be held under a hot iron for 15 seconds to heat-cure the system.

EXAMPLE 2

Series II formulations use polyurethane or polyesterurethane dispersions. A typical formulation in this series is provided.

| Series II Formulation | |
|---|---|
| Polyurethane[1] or Polyesterurethane[2] Dispersions: | 12.0 g. |
| Surfactant[3]: | 0.60 g. |

-continued

| Series II Formulation | |
|---|---|
| Flow Aid[4]: | 0.90 g. |
| Thickener[5]: | 0.15 g. |
| Dye[6]: | 0.05 g. |

[1]Polyurethane Dispersions: Bayhydrol 402A (Aqueous Polyurethane Dispersion) (Miles); Bayhydrol LS 2033 (Aqueous Polyurethane Dispersion) (Miles); Bayhydrol 140 AQ (Aqueous Polyurethane Dispersion) (Miles)
[2]Polyesterurethane Dispersion: Impranil DLN (Aqueous Polyester-Polyurethane Dispersion) (Miles)
[3]Surfactant: Silwet L-7601 (Polyalkylene oxide modified polydimethylsiloxane) (Union Carbide)
[4]Flow Aid: Texanol (2,2,4 trimethyl-1,3-pentanediol monoisobutyrate)(Eastman Kodak)
[5]Thickener: Acrysol RM-825 (Polyurethene resin (24-26%), Diethylene glycol monobutyl ether (16-18%), $H_2O$ (57-59%)) (Rohm & Haas)
[6]Dyes: DINO, CDINO, 1',3'-Dihydro-1',3',3'-trimethyl-6-nitrospiro[2H-1-benzopyran-2,2'-(2H)-indole]

A typical ink formulation is prepared in the following manner. Acrysol RM 825, Silwet L-7601 and Texanol are added to Bayhydrol 140AQ (or Impranil DLN) and stirred until a homogenous mixture is obtained. The photochromic dye is then added and stirring continued for an additional hour. If the formulations are used in flexoprinting or gravure printing they are heat-cured during the printing process. If the formulation is silk-screened it can contacted with a hot surface, such as a hot iron, for 15 seconds to heat-cure the system.

Other embodiments are within the following claims.

We claim:

1. Photochromic ink consisting essentially of polyvinyl chloride, a plasticizer, a dispersant, and a spiroheterocyle dye.

2. The photochromic ink of claim 1 wherein said dye is selected from the group consisting of DINO (1,3-dihydro-1,3,3-trimethylspiro (2H-indole-2,3'-[3H]-naphth[2,1,-b][1,4]oxazine), CDINO (5-Chloro-1,3-dihydro-1,3,3-trimethylspiro (2H-indole-2,3'-[3H]-naphth[2,1-b][1,4]oxazine), and 1',3'-Dihydro-1',3',3'-trimethyl-6-nitrospiro[2H-1-benzopyran-2,2'-(2H)-indole].

3. Photochromic ink consisting essentially of polyvinyl chloride, a plasticizer, a dispersant, and a metal dithiozonate dye.

4. The photochromic ink of claim 3, wherein said dye is (diphenylthiocarbazono) phenyl mercury (DPM).

5. The photochromic ink of claims 1, 2, 3 or 4 wherein said plasticizer is selected from the group consisting of dioctyl phthalate, tritolyl phosphate, epoxidized soybean oil, and palatinol.

6. The photochromic ink of claims 1, 2, 3 or 4 wherein said dispersant is selected from the group consisting of diisobutyl ketone, and butyl acetate.

7. Photochromic ink consisting essentially of polyurethane or polyesterurethane, a surfactant, a flow aid, a thickener, and a spiroheterocycle dye.

8. The photochromic ink of claim 7, wherein said dye is selected from the group consisting of DINO (1,3-dihydro-1,3,3-trimethylspiro (2H-indole-2,3'-[3H]-naphth[2,1,-b][1,4]oxazine), CDINO (5-Chloro-1,3-dihydro-1,3,3-trimethylspiro (2H-indole-2,3'-[3H]-naphth[2,1-b][1,4]oxazine), and 1',3'-Dihydro-1',3',3'-trimethyl-6-nitrospiro[2H-1-benzopyran-2,2'-(2H)-indole].

9. Photochromic ink consisting essentially of polyurethane or polyesterurethane, a surfactant, a flow aid, a thickener, and a metal dithiozonate dye.

10. The photochromic ink of claim 9, wherein said dye is (diphenylthiocarbazono) phenyl mercury (DPM).

11. Method for marking a substrate, comprising overlaying onto said substrate a photochromic ink consisting essentially of a spiroheterocycle or metal dithiozonate dye and a polymer selected from the group consisting of polyvinyl chloride, and polyesterurethane.

12. The method of claim 11, wherein said photochromic ink is overlayed by printing.

13. The method of claim 11, wherein said photochromic ink is overlayed by coating.

14. Method for marking a substrate, comprising incorporating into said substrate a photochromic ink consisting essentially of a spiroheterocycle or metal dithiozonate dye and a polymer selected from the group consisting of polyvinyl chloride, and polyesterurethane.

15. The method of claims 11, 12, 13, or 14, wherein said substrate is organic.

16. The method of claims 11, 12, 13, or 14, wherein said substrate is non-organic.

17. The method of claim 14, wherein said substrate is selected from the group consisting of paper, plastic, fabric, thread, and collagen.

18. The method of claim 16, wherein said substrate is selected from the group consisting of metal, metal composites, ceramics and graphite.

19. Photochromic ink consisting essentially of a spiroheterocycle photochromic dye and polyvinyl chloride.

20. Photochromic ink consisting essentially of a spiroheterocycle photochromic dye and polyesterurethane.

21. Photochromic ink consisting essentially of a metal dithiozonate photochromic dye and polyvinyl chloride.

22. Photochromic ink consisting essentially of a metal dithiozonate photochromic dye and polyurethane.

23. Photochromic ink consisting essentially of a metal dithiozonate photochromic dye and polyesterurethane.

24. The photochromic ink of claims 19, or 20, wherein said dye is selected from the group consisting of Spiro(indolino)napthoxazines, Spiro(indolino) pyridobenzoxazines, Spiro (indolino) benzoxazines, Spiro (indolino) benzopyrans, Spiro (indolino) naphthopyrans, Spiro (benzindolino) pyridobenzoxazines, Spiro (benzindolino) naphthoxazines, Spiro (benzindolino) naphthopyrans and Spiro (di) -hydroindolizines.

25. The method of claim 11 or 14 wherein said spiroheterocycle dye is selected from the group consisting of Spiro(indolino)napthoxazines, Spiro(indolino) pyridobenzoxazines, Spiro (indolino) benzoxazines, Spiro (indolino) benzopyrans, Spiro (indolino) naphthopyrans, Spiro (benzindolino) pyridobenzoxazines, Spiro (benzindolino) naphthoxazines, Spiro (benzindolino) naphthopyrans and Spiro (di) -hydroindolizines.

26. The photochromic ink of claim 1, wherein said dye is selected from the group consisting of Spiro(indolino)napthoxazines, Spiro(indolino) pyridobenzoxazines, Spiro (indolino) benzoxazines, Spiro (indolino) benzopyrans, Spiro (indolino) naphthopyrans, Spiro (benzindolino) pyridobenzoxazines, Spiro (benzindolino) naphthoxazines, Spiro (benzindolino) naphthopyrans and Spiro (di) -hydroindolizines.

27. The photochromic ink of claim 26 wherein said plasticizer is selected from the group consisting of dioctyl phthalate, tritolyl phosphate, epoxidized soybean oil, and palatinol.

28. The photochromic ink of claim 26 wherein said dispersant is selected from the group consisting of diisobutyl ketone, and butyl acetate.

29. The method of claim 11 or 14 wherein said spiroheterocycle dye is selected from the group consisting of DINO (1,3-dihydro-1,3,3-trimethylspiro (2H-indole-2,3'-[3H]-naphth[2,1,-b][1,4]oxazine), CDINO (5-Chloro-1,3-dihydro-1,3,3-trimethylspiro (2H-indole-2,3'-[3H]-naphth[2,1,-b][1,4]oxazine, and 1',3'-Dihydro-1',3',3'-trimethyl-6-nitrospiro[2H-1-benzopyran-2,2'-(2H)-indole].

30. The method of claim 11 or 14 wherein said metal dithiozonate dye is (diphenylthiocarbazono) phenyl mercury (DPM).

31. The photochromic ink of claims 19, or 20 wherein said dye is selected from the group consisting of DINO (1,3-dihydro-1,3,3-trimethylspiro (2H-indole-2,3'-[3H]-naphth[2,1,-b][1,4]oxazine), CDINO (5-Chloro-1,3-dihydro-1,3,3-trimethylspiro (2H-indole-2,3'-[3H]-naphth[2,1,-b][1,4]oxazine, and 1',3'-Dihydro-1',3',3'-trimethyl-6-nitrospiro[2H-1-benzopyran-2,2'-(2H) -indole].

32. The photochromic ink of claims 21, 22, or 23 wherein said dye is (diphenylthiocarbazono) phenyl mercury (DPM).

* * * * *